US008201217B1

(12) United States Patent
Begen et al.

(10) Patent No.: US 8,201,217 B1
(45) Date of Patent: Jun. 12, 2012

(54) SYSTEMS AND METHODS FOR SINGLE SIGN-IN FOR MULTIPLE ACCOUNTS

(75) Inventors: Geoffrey C. Begen, Lake Forrest, CA (US); Keith D. Bussell, Los Angeles, CA (US)

(73) Assignee: Stamps.com Inc., Los Angeles, CA (US)

( * ) Notice: Subject to any disclaimer, the term of this patent is extended or adjusted under 35 U.S.C. 154(b) by 1263 days.

(21) Appl. No.: 11/542,658

(22) Filed: Oct. 3, 2006

(51) Int. Cl.
H04L 9/32 (2006.01)
H04L 29/06 (2006.01)

(52) U.S. Cl. ............... 726/3; 726/2; 726/12; 726/14; 726/15

(58) Field of Classification Search ............ 726/12, 726/14, 15, 2, 3
See application file for complete search history.

(56) References Cited

U.S. PATENT DOCUMENTS

| 4,885,778 | A | * | 12/1989 | Weiss | 713/184 |
|---|---|---|---|---|---|
| 5,586,260 | A | * | 12/1996 | Hu | 726/12 |
| 6,047,268 | A | * | 4/2000 | Bartoli et al. | 705/35 |
| 6,052,785 | A | * | 4/2000 | Lin et al. | 726/5 |
| 6,067,623 | A | * | 5/2000 | Blakley et al. | 726/5 |
| 6,199,077 | B1 | * | 3/2001 | Inala et al. | 715/201 |
| 6,205,480 | B1 | * | 3/2001 | Broadhurst et al. | 709/225 |
| 6,606,663 | B1 | * | 8/2003 | Liao et al. | 709/229 |
| 6,678,731 | B1 | * | 1/2004 | Howard et al. | 709/225 |
| 6,934,706 | B1 | * | 8/2005 | Mancuso et al. | 1/1 |
| 7,016,875 | B1 | * | 3/2006 | Steele et al. | 705/44 |
| 7,039,714 | B1 | * | 5/2006 | Blakley, III et al. | 709/229 |
| 7,082,532 | B1 | * | 7/2006 | Vick et al. | 713/155 |
| 7,137,006 | B1 | * | 11/2006 | Grandcolas et al. | 713/180 |
| 7,237,261 | B1 | | 6/2007 | Huber et al. | |
| 7,243,842 | B1 | * | 7/2007 | Leon et al. | 235/381 |
| 2001/0005887 | A1 | * | 6/2001 | Boroditsky et al. | 713/183 |
| 2001/0047335 | A1 | * | 11/2001 | Arndt et al. | 705/44 |
| 2002/0178354 | A1 | * | 11/2002 | Ogg et al. | 713/155 |
| 2002/0184217 | A1 | * | 12/2002 | Bisbee et al. | 707/9 |
| 2003/0065940 | A1 | * | 4/2003 | Brezak et al. | 713/201 |
| 2003/0083894 | A1 | | 5/2003 | Bell et al. | |
| 2003/0149781 | A1 | | 8/2003 | Yared et al. | |

(Continued)

OTHER PUBLICATIONS

Kifer et al., "Database Systems: An Application-Oriented Approach", 2005, Addison-Wesley, Second Edition, pp. 44, 76-78.*
Miller et al, "Kerberos Authentication and Authorization System", Project Athena Technical Plan, Oct. 27, 1998, pp. 7,8.*
Agrawal, Manish et al. "A Conceptual Approach to Information Security in Financial Account Aggregation", 2004.*
Emery, David. "All about account aggregation", Jun. 2002.*

(Continued)

Primary Examiner — Michael Simitoski
(74) Attorney, Agent, or Firm — Fulbright & Jaworski L.L.P.

(57) ABSTRACT

Systems and methods which facilitate single user sign-in for multiple accounts are shown. Embodiments create a single user base which maps users to multiple accounts. The use of a single set of credentials by the user is provided for according to embodiments irrespective of the applications associated with the various accounts having very different security protocols. A system hosting the shared user base preferably provides a single authentication point for multiple services. Embodiments an authenticator string, as may be passed between a client and bridge server and/or client and application, in order to enable user access, detect attacks with respect to a client conversation, etcetera. In addition to providing a shared user base for single sign-in, embodiments provide additional shared functionality and/or functionality not available from the applications themselves.

27 Claims, 1 Drawing Sheet

U.S. PATENT DOCUMENTS

| | | | |
|---|---|---|---|
| 2003/0149900 A1* | 8/2003 | Glassman et al. | 713/202 |
| 2003/0182551 A1* | 9/2003 | Frantz et al. | 713/170 |
| 2003/0191711 A1* | 10/2003 | Jamison et al. | 705/40 |
| 2004/0059909 A1 | 3/2004 | Le Pennec et al. | |
| 2004/0098595 A1* | 5/2004 | Aupperle et al. | 713/185 |
| 2004/0250118 A1* | 12/2004 | Andreev et al. | 713/201 |
| 2004/0260953 A1* | 12/2004 | Jamieson et al. | 713/202 |
| 2005/0004837 A1* | 1/2005 | Sweeney et al. | 705/14 |
| 2005/0005094 A1* | 1/2005 | Jamieson et al. | 713/155 |
| 2005/0044380 A1* | 2/2005 | Bostick et al. | 713/182 |
| 2005/0114701 A1* | 5/2005 | Atkins et al. | 713/201 |
| 2005/0154887 A1* | 7/2005 | Birk et al. | 713/168 |
| 2005/0171863 A1* | 8/2005 | Hagen | 705/26 |
| 2006/0075475 A1* | 4/2006 | Boulos et al. | 726/6 |
| 2006/0080731 A1* | 4/2006 | Zhang et al. | 726/8 |
| 2006/0129847 A1* | 6/2006 | Pitsos | 713/193 |
| 2007/0220062 A1* | 9/2007 | Carberry et al. | 707/201 |
| 2008/0046349 A1* | 2/2008 | Elberg et al. | 705/35 |

OTHER PUBLICATIONS

Blundo, Carlo et al. "A Lightweight Approach to Authenticated Web Caching", 2005.*

Liu, Alex X. et al. "A Secure Cookie Protocol", 2005.*

Khu-smith, Vorapranee and Chris Mitchell. "Enhancing the Security of Cookies", 2002.*

Samar, Vipin. "Single Sign-On Using Cookies for Web Applications", 1999.*

* cited by examiner

SYSTEMS AND METHODS FOR SINGLE SIGN-IN FOR MULTIPLE ACCOUNTS

CROSS-REFERENCE TO RELATED APPLICATIONS

The present application is related to U.S. Pat. No. 8,046,823 entitled "Secure Application Bridge Server," filed concurrently herewith, and to U.S. Pat. No. 7,251,632 entitled "Machine Dependent Login for On-Line Value-Bearing Item System," filed Oct. 18, 2000, the disclosures of which are hereby incorporated herein by reference.

TECHNICAL FIELD

The present invention is related generally to providing user access to a plurality of accounts and, more particularly, to providing user access to a plurality of accounts using a single user sign-in.

BACKGROUND OF THE INVENTION

Various applications provide restrictions on user access and user access protocols for a number of reasons. User access is restricted in order to protect sensitive data, value in an account, etcetera. User access protocols are adopted wherein individual users are assigned accounts for accessing such applications. Such accounts typically define the application features and functions available to the user, restrictions (e.g., time restrictions, monetary restrictions, etcetera) on the user's use of the application, and/or the like.

Postage printing applications, providing user control and access to postage value for generating and printing postage indicia, are one example of applications wherein accounts are implemented to control user access. Online postage generation and printing is provided through the use of secure postal servers having crypto vaults for storing postage credit. Postal clients, uniquely configured to implement the security protocols of the secure postal servers, allow a user to remotely access a postal server and perform functions with respect to a postage meter account, such as query a balance, add postage value, and deduct postage value and generate a postage indicia. Accordingly, user access to such secure postal servers is tightly controlled and generally implement extensive, often proprietary, security protocols.

Online stores, such as a postal supply store, providing user access to product and service catalogues and ordering, is another example of applications wherein accounts are implemented to control user access. Online ordering of products and services is provided through the use of servers providing an electronic cart or basket associated with a unique account. Because payment for purchased products and services is also provided online, such systems typically implement security protocols, such as standardized security protocols available using widely available clients such as web browsers.

From the above, it can be seen that a user may have multiple accounts, perhaps associated with different applications. For example, a particular user may have a postal account for generating and printing postage online and a store account for selecting and purchasing supplies. Accordingly, the user may be required to remember multiple account access criteria (e.g., multiple user names, passwords, etcetera).

Moreover, although such accounts may be related in some way, such as a postal account for printing postage and a postal store account for ordering postal supplies, the security or other access requirements may be very different. For example, the security requirements for an online postal printing application often require storing credentials in a client registry and/or other features to provide a very high level of security or to meet postal requirements, and thus often utilize a proprietary client. In contrast, although providing for secure access and communication, online stores generally implement open standards based security protocols, such as to promote ready access to the general public. Thus, even somewhat related accounts will by necessity be separate and isolated from one another, often requiring different clients for user access, requiring different credentials, etcetera.

For example, a user may be required to remember credentials (e.g., passwords) unique to each account, particularly in the case where the credential requirements by different applications are different (e.g., password length, alphanumeric requirements, etcetera). Even where different applications adopt similar credentials requirements, a user may not be able to use the same credentials for each account. For example, although a user has a particular user name with respect to a account associated with a first application, this user name may have already been in use with respect to another application and thus not be available for the user for a account associated with that application.

In addition to remembering and managing credentials unique to each account, users must also create, manage, and update the account information for the multiple accounts individually. For example, user profile information (e.g., user name, address, phone number, etcetera) will often be required with respect to each account, and thus must be repeatedly input and updated by the user for each account. Similarly, payment information, such as credit card number and expiration date will typically need to be input and updated for each account.

Like the information provided by the user with respect to multiple accounts, the information provided to the user will be separate and independent, even for somewhat related accounts. For example, reports showing the account activity (e.g., purchases made, payments made, etcetera), will only be available separately for each account.

Moreover, even where the applications associated with a particular user's accounts are provided or supported by a same vendor, supporting that user is complicated by the fact that the user has multiple sets of credentials for accessing the accounts. For example, when calling customer support to resolve an issue which touches on several applications, the user will need to provide the customer support representative with information about each such account. In order to resolve the problem, the customer support representative may need to separately access each such account. It can be readily appreciated that the foregoing will require additional time and will result in a diminished user experience.

Not only do the foregoing separate accounts for applications provided by a same vendor result in customer support issues, but the vendor itself may not be able to correlate the various activities or behavior of the user. For example, a vendor may be unable to correlate a particular user's activity with respect to one account to that same user's activity with respect to another account, although the vendor may have visibility into each such account separately. Accordingly, marketing opportunities and the ability to collect robust information with respect to user behavior system wide may be missed.

The foregoing problems are exasperated as new services or applications are added. For example, a new user base would be created for the new service, having associated user credentials, profiles, etcetera, which is separate and isolated from the other existing user bases.

BRIEF SUMMARY OF THE INVENTION

The present invention is directed to systems and methods which facilitate single user sign-in for multiple accounts. Embodiments of the invention create a single user base (referred to herein as a shared user base) which maps users to multiple accounts, whether such accounts are associated with the same or different services, applications, etcetera. For example, where a user has an account with an online postage printing application and an online postal supply store, that user will use a single user name and password, as provided in the shared user base, to access the user's online postage printing application and one postal supply store, according to embodiments of the invention. The use of a single set of credentials (e.g., user name and password) by the user is provided for according to embodiments of the invention irrespective of the applications associated with the various accounts having very different security protocols.

In operation according to a preferred embodiment, a system hosting the shared user base also provides a single authentication point for multiple services. For example, embodiments of the present invention utilize a bridge server, in communication with applications to which a plurality of accounts are associated, to host a shared user base and provide validation of user credentials for providing access to a plurality of the user's accounts. Accordingly, the user may conduct a single sign-in and, for the duration of a session enabled thereby, access a plurality of that user's accounts, even accounts associated with different applications. For example, if a user initially signs in to generate and print postage using an online postage printing application, as long as the user's session has not terminated (e.g., expired, logged off, etcetera) the user may access other accounts associated with the shared user base, such as an online postal supply store account, without again being asked for the user's credentials.

Having single sign-in implemented in a shared host, such as the aforementioned bridge server, facilitates the centralization of user credential management and validation. For example, a user may readily manage password changes effective across all accounts. Moreover, the various applications need not duplicate the resources for validating user credentials. Customer support can be more readily provided as many problems can be addressed in one place.

Additionally, single sign-in implemented according to embodiments of the invention facilitates acquisition and management of user profile information. For example, a particular application associated with the users' accounts, such as the online postal supply store, may store robust user profile information, such as user name, address, phone number, etcetera. Although traditionally requiring separate input into the various applications a user may have accounts for, embodiments of the present invention facilitate sharing this information among such applications. For example, a shared host such as the aforementioned bridge server may use this information as stored by one application as a repository or source for the user profile information and make it available to any of the other applications, such as a postage printing application, as needed. Such an embodiment provides a single point where the user may input, manage, and update the user profile information. For example, after a user inputs user profile information, or updates user profile information, a bridge server of the present invention may propagate that information, as appropriate, to various applications for which the user has accounts for.

Operation of single sign-in of embodiments of the present invention provides features in addition to those available from the individual applications themselves. For example, integrated reports, aggregating user activity across multiple accounts and/or applications, can be provided according to embodiments of the invention. For example, a user may receive a monthly report of all their postage purchases and prints as well as their purchases of postal supplies. Moreover, unified billing for service fees associated with the user of multiple accounts may be provided according to the present invention. Business intelligence may be used to analyze user's behavior across multiple accounts to provide information to business and marketing regarding aggregated or related usage of various services. Not only may messages related to a particular application the user is currently using be provided to the user but, through integration provided by single sign-in of embodiments of the invention, messages related to other applications for which the user has a account for may be provided to the user. Similarly, as a user's use of one application suggests a need for use of another application (e.g., printing stamps requiring controlled stock suggesting the need to order more controlled stock), integration provided by single sign-in of embodiments of the invention provides messages and/or automation to facilitate use of the other application. New and additional user features, such as facilitating multiple users for an otherwise single account, combining transactions of one or more application to define new transactions, etcetera, may be provided by a host system providing single sign-in according to embodiments of the invention.

According to embodiments of the invention, a bridge server may be implemented as a web server that is exposed to a public network, such as the Internet, disposed between a client application (e.g., operable upon a terminal at the user's location) and one or more servers hosting applications associated with the user's accounts. In such embodiments, the bridge server becomes the public interface for the applications. Accordingly, an additional layer of isolation or protection is provided with respect to the applications as their servers may be only indirectly coupled to the public network (i.e., through one or more bridge servers), in contrast to direct connection to the public network as may be typical for the server's native security protocols.

Embodiments of the invention additionally or alternatively provide a bridge server in communication with one or more servers hosting applications associated with the user's accounts, allowing a client application to interact directly with the servers hosting the applications. Application servers of such embodiments preferably relay user credentials to the bridge server for user verification, and may communicate with the bridge server for account identification, user profile information, etcetera.

A shared user base is created from the user base of a primary application according to an embodiment of the invention. For example, the user base of a primary application, such as a postage printing application, may be used to initially populate a user base to be shared among a plurality of applications. In a preferred embodiment, a database, such as may comprise various indexed records, tables, databases, etcetera, is used to map users to multiple accounts. Accordingly, a user identifier (e.g., user ID) may map to user identifiers of a plurality of services (e.g., different user IDs native to the various other accounts).

In operation according to a preferred embodiment, client applications or applications being accessed by client applications will link into a bridge server, the user will be authenticated by the bridge server (e.g., using a user name and password), and a valid user will be correlated to an appropriate account of the application by the bridge server. The bridge server may negotiate with the application using the native security protocols of the application to access the appropriate account on behalf of the user or may pass information to the application and/or client to allow the user to access the appropriate account directly.

User authentication by a bridge server of embodiments of the invention preferably utilizes substantially standard (i.e., widely accepted) credentials, such as user name and password. Accordingly, a thin client, simple browser interface, or other easily implemented client configurations may be supported by embodiments of the invention. Moreover, integration with third party applications and/or systems may be relatively easily accommodated. Additional credentials as may be needed by the particular application being accessed are preferably stored in a database of the bridge server, and may be referenced by the credentials provided to the bridge server (e.g., by user name). Once the bridge server has validated the user (e.g., validated the password as properly associated with the user name), the bridge server can access the appropriate application credentials and implement a bridge between the client and application or pass the credentials to the application to facilitate interaction between the client and application.

Embodiments of the invention utilize an authenticator string, as may be passed between a client and bridge server and/or client and application, in order to enable user access, detect attacks with respect to a client conversation, etcetera. In operation according to one embodiment, when a user initially logs on to the bridge server or an application, the bridge server authenticates the user's credentials (e.g., comparing the user name and password to information stored by the bridge server) and issues an authenticator string to the client if the authentication is successful. The authenticator string is returned by the client with the subsequent communication, the authenticator string is validated by the bridge server, and a new authenticator string is returned to the client with any responsive communication. By constantly updating the authenticator string in this manner, a replay attack is readily detected. Moreover, communications outside of the client conversation, even those were the user is innocently logged on from a different terminal, is readily detected due to the authenticator string (although perhaps being a legitimate authenticator string) being out of sync.

In addition to providing a shared user base for single sign-in, embodiments of the present invention provide additional shared functionality. For example, payment processing may be shared by the applications for which single sign-in is provided, thereby eliminating the need for each such application to operate separate payment processing engines. Moreover, using a bridge server or other shared host to provide such payment processing may provide additional security with respect to user's payment information (e.g., credit card accounts, bank accounts, etcetera), as this information need only be provided to a single point rather than to each system for which payments are to be made.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

In order to aid in the understanding of concepts of the present invention, embodiments are described herein with reference to postage printing applications and online store applications. However, it should be appreciated that concepts of the present invention are applicable to a number of applications, and thus the invention is not limited to the particular exemplary applications discussed.

Figure 1:
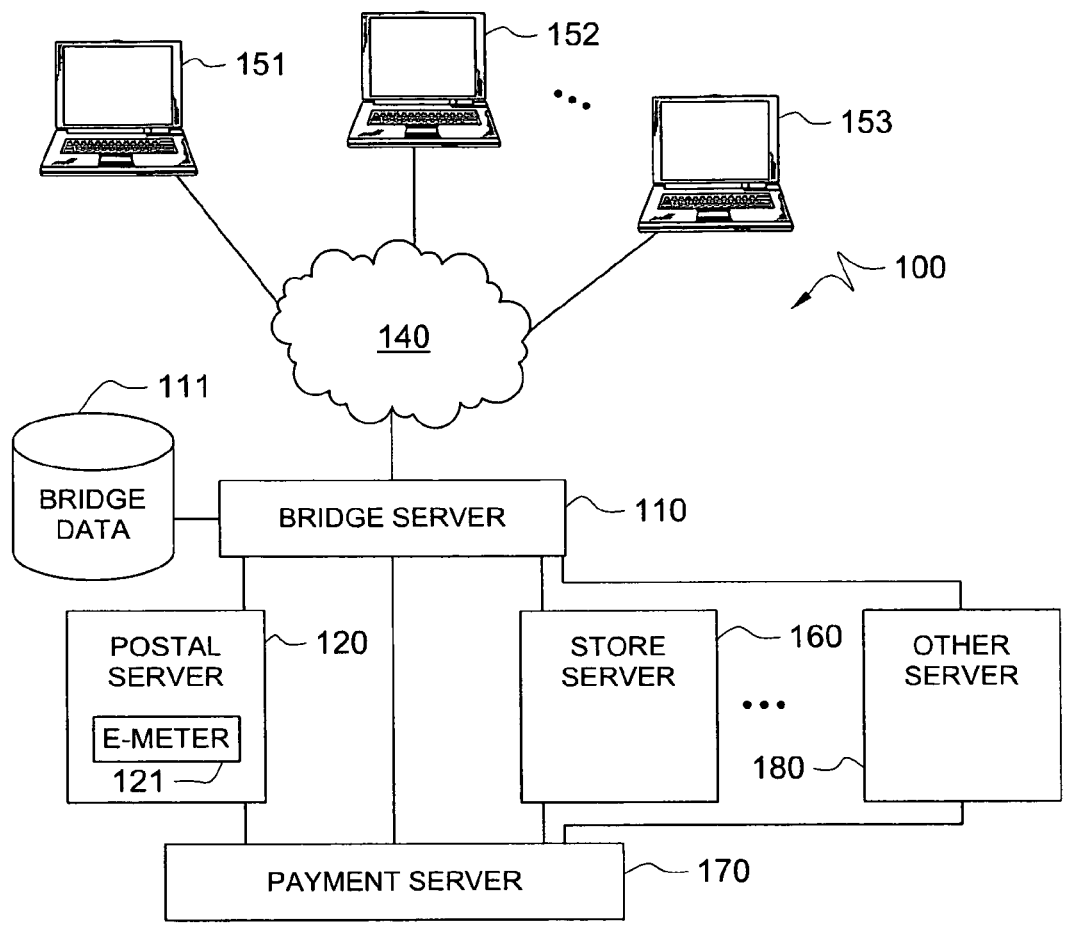
FIG. 1 shows a system adapted according to an embodiment of the present invention.

Directing attention to FIG. 1, system 100 provides online postage generation and printing services (using postal server 120), online store services (using store server 160), and other services (using other server 180, such as may provide a custom selected/designed stamp generation service, an online auction service, a banking application, an accounting application, and/or the like) to users at terminals 151-153 via network 140 using terminals 151-153. Although illustrated as personal computer systems, terminals 151-153 may comprise any terminal configuration (e.g., personal digital assistant, cellular telephone, two-way pager, processor-based kiosk, etcetera) suitable for desired user interaction with bridge server 110, postal server 120, store server 160, payment server 170, and/or other server 180.

Bridge server 110, postal server 120, store server 160, payment server 170, and other server 180 may be operable upon any number of processor-based host systems, such as INTEL PENTIUM based servers, as are well known in the art. Moreover, various ones of these servers may be provided on a same processor-based host system. Similarly, various ones of these servers may be provided on a plurality of processor-based host systems, such as to provide a distributed configuration and/or to provide a server array for accommodating increased capacity.

Network 140 may comprise any network configuration (e.g., local area network (LAN), metropolitan area network (MAN), wide area network (WAN), wireless network, fiber optic network, intranet, extranet, the Internet, etcetera) suitable for desired user interaction with bridge server 110, it being appreciated that the network configuration implemented by bridge server 110 may be different than that directly supported by postal server 120, store server 160, payment server 170, and/or other server 180, thereby resulting in bridge server 110 providing network bridging services in addition to the single sign-in services discussed below. Communications between a client and a bridge server of embodiments are encrypted (e.g., using secure socket layer (SSL) communications) to prevent eavesdropping or snooping by systems or individuals other than an intended recipient.

Postal server 120 in a prior art configuration would typically couple substantially directly to network 140 (i.e., without another server, such as bridge server 110, disposed between network 140 and postal server 120) for interaction with terminals 151-153. Similarly, store server 160 in a prior art configuration would independently couple substantially directly to network 140 for interaction with terminals 151-153. Other server 180 in a prior art configuration may be independently coupled substantially directly to network 140 for interaction with terminals 151-153 to provide one or more services, such as a custom selected/designed stamp generation service (e.g., the PHOTOSTAMPS service as provided by Stamps.com, the assignee of the present application) for example. Moreover, although perhaps providing somewhat related operation (e.g., postal server 120 providing postage generation and printing services, store server 160 providing sales of postal supplies, and other server 180 providing custom stamp generation services in the foregoing example), postal server 120, store server 160, and other server 180 would each typically have separate and unique accounts for a same user (i.e., a user of terminal 151 would have a different user name and password for postal server 120, store server 160, and other server 180).

A goal of embodiments of the present invention is to provide integration or sharing of the user base of multiple applications, such as those of postal server 120, store server 160, and other server 180, and to facilitate a single sign-in for a user to access any or all such applications for which the user has a valid account, whether such accounts are associated with the same or different services, applications, etcetera. However, adapting such a plurality of applications to share a common user base and a common set of user credentials for a single sign-in has proven to be problematic.

For example, where postal server 120, store server 160, and other server 180 are in operation prior to configuration for sharing a user base, each such system may have non-overlapping user bases. That is, a account associated with one such application may have a user name associated therewith which is not available for that same user's account associated with another such application. This problem increases with each such application attempting to share the user base. It becomes problematic to create a shared user base without redefining the existing user base of one or more applications.

Potentially more problematic than the non-overlapping user base issue, the security protocols and user credentials for each such application are often very different. These differences are often deeply imbedded in the code of the systems and may necessitate substantial modification to achieve compatibility. Moreover, although it may be possible to modify each such application to directly implement the same security protocols, such an approach may not provide desirable results. For example, certain applications, such as the postage generation and printing application of postal server 120, may implement proprietary or complex security protocols (e.g., due to governmental or postal regulations, because of legacy systems, in order to avoid lengthy certification/recertification procedures, etcetera), which are not desirable or acceptable with respect to other applications. As one example, it is typically desirable to utilize standardized security protocols, such as those available through browser interfaces, with respect to an online store application in order to enable a large market of potential purchasers to easily interact with the store application. Accordingly, it would generally not be desirable to implement the aforementioned proprietary or complex security protocols of a postal application with respect to the store application. Moreover, it may not be possible (e.g., due to regulations, legacy support, certification, etcetera) to implement the standardized security protocols of the store application with respect to the postal application. Accordingly, no "lowest common denominator," or even "highest common denominator," may be available in regard to the security protocols of the various applications.

Even if one were to modify each application to implement the same security protocols, a system providing single sign-in capabilities may not result. For example, postal applications, such as those operable upon postal server 120, often require credentials to be stored on the client, wherein those credentials are exchanged and updated as a postal conversation between the client and postal server is conducted. Accordingly, if a user were to sign-in with respect to postal server 120, the credentials may be exchanged and updated allowing continued interaction with postal server 120. However, if the user then attempted to interact with store server 160, those credentials may be out of sync with respect to store server 160, thereby requiring reregistration of the user or some other procedure to resynchronize the credentials. Moreover, if such a system were to accommodate a browser interface, such as is commonly expected for an online store application, a special plug-in or other customized code would need to be provided to the client in order to accommodate persistent storage of the aforementioned credentials. Further complicating matters, if a user were to try to access the system from a different terminal (as is common with online store applications and other web services), the user's credentials would need to be reacquired by a reregistration process or similar procedure for obtaining the credentials.

The embodiment of FIG. 1, adapted according to an embodiment of the invention is shown, includes bridge server 110 providing single sign-in services with respect to a plurality of applications. Specifically, a postal generation and printing application of postal server 120, an online store application of store server 160, and an application of other server 180 are provided single sign-in services by bridge server 110 of the illustrated embodiment. Moreover, using the integration provided by bridge server 110, functions which would be separately provided by each of a plurality of applications, such as payment services, are consolidated as a single shared application, here shown as being provided by payment server 170.

It should be appreciated that, although illustrated as a single bridge server, embodiments of the present invention may implement any number of bridge servers. For example, scaling may be provided by multiple ones of the bridge servers. Although shown in the illustrated embodiment as separate servers, embodiments of the present invention may implement bridge server functionality and application functionality upon a same server or other host system.

Postal server 120 of the illustrated embodiment provides the aforementioned postage generation and printing services using proprietary security protocols native thereto. Accordingly, without adaptation according to an embodiment of the present invention, terminals 151-153 would implement a client uniquely adapted for interfacing with postal server 120, such as to query a value account stored in e-meter 121, conduct a transaction deducting value from or adding value to a value account stored in e-meter 121, etcetera.

Store server 160 of the illustrated embodiment provides the aforementioned online store services and/or other server 180 of the illustrated embodiment provides, in the foregoing example, custom selected/designed stamp generation services using standardized security protocols, such as those widely available using web browser interfaces. Accordingly, without adaptation according to an embodiment of the present invention, terminals 151-153 would implement a client adapted for interfacing with store server 160 and/or other server 180 which is substantially different than the client implemented with respect to postal server 120. Even where the user base happened to be overlapping with respect to postal server 120 and store server 160 and other server 180, a user would not be enabled to access each application corresponding to these servers using a single sign-in. Moreover, postal server 120 and store server 160 and other server 180 would not be enabled to share information, such as user profile information, etcetera, therebetween.

However, bridge server 110 of the illustrated embodiment is provided in communication with postal server 120, store server 160, other server 180, and terminals 151-153. Specifically, the illustrated embodiment provides bridge server 110 disposed between postal server 120 and terminals 151-153, abstracting the security model of postal server 120 and providing a security protocol interpreter facilitating the use of different, non-proprietary security protocols by the clients of terminals 151-153, as discussed in further detail in the above referenced patent application entitled "Secure Application Bridge Server". Additionally, the illustrated embodiment provides bridge server 110 disposed in communication with store server 160 and other server 180 to provide user authentication functionality with respect to clients of terminals 151-153, using non-proprietary security protocols, coupled to store server 160 and other server 180 via network 140. User authentication by bridge server 110 of a preferred embodiment utilizes substantially standard (i.e., widely accepted) security protocols, such as through a client providing user name and password with a logon request. Accordingly, clients in use at terminals 151-153 may comprise a thin client, a simple browser interface, or even a third party application and yet be enabled to access applications of each of postal server 120, store server 160, and other server 180. Moreover, through management of user credentials, the illustrated embodiment of bridge server 110 facilitates a user session in which a user signs in a single time and is enabled to access applications of each of postal server 120, store server 160, and other server 180.

According to a preferred embodiment, bridge server 110 takes on the electronic address of postal server 120 so that all communications addressed to postal server 120 are instead directed to bridge server 110. Such addressing may be in addition to bridge server 110 having its own unique electronic address. For example, a unique address for bridge server 110 may be used by new clients adapted to implement security protocols supported by bridge server 110 (e.g., standardized clients) whereas the redirected address for postal server 120 may be used by old clients adapted to implement security protocols supported by postal server 120 (e.g., proprietary clients). Accordingly, bridge server 110 may readily recognize aspects of the client sourcing communications.

Bridge server 110 of preferred embodiments does not take on the electronic address of store server 160 or other server 180. Instead, communications addressed to store server 160 and other server 180 continue to be directed to store server 160 and other server 180, respectively, according to embodiments of the invention. As described further below, store server 160 and other server 180 of embodiments will itself interact with bridge server 110 for user authentication, etcetera. Because in the exemplary embodiment described below interaction between bridge server 110 and store server 160 and other server 180 is substantially the same, details with respect to operation according to a preferred embodiment will be provided only with respect to store server 160 below. However, it should be understood that interaction between bridge server 110 and other server 180 may follow that described with respect to interaction between bridge server 110 and store server 160. It should be appreciated that there is no limitation that interaction between bridge server 110 and other server 180 be restricted to that consistent with store server 160. For example, where proprietary security protocols are utilized by an application hosted by other server 180, interaction between bridge server 110 and other server 180 may correspond to that of postal server 120.

From the foregoing, it should be appreciated that bridge server 110 of the illustrated embodiment provides both a secure interface disposed between clients and an application server (e.g., postal server 120) and a security service disposed in communication with an application server (e.g., store server 160). It may be desirable to utilize bridge server 110 as a security service where an application server directly implements desired security protocols (e.g., a "lowest common denominator" or "highest common denominator" security protocol). However, it may be desirable to utilize bridge server 110 in a secure interface configuration to provide security abstracting for implementing a desired security protocol. Additionally or alternatively to implement additional features and functions not otherwise provided by a particular application server. For example, bridge server 110 may be utilized to provide multi-user access with unique multi-user identification in association with one secure application account. Similarly, bridge server 110 may be utilized to provide combining of transactions to define new transactions not previously available from an application.

In operation according to embodiments of the invention, bridge server 110 provides bridging of security protocols between clients of terminals 151-153 and postal server 120. Accordingly, client applications of terminals 151-153 will preferably link into bridge server 110 through network 140 and the user will be authenticated by bridge server 110, such as by bridge server 110 comparing user name and password information provided by the client application to user name and password information stored in bridge data 111. A valid user will be correlated to an appropriate account (e.g., an associated value account stored in e-meter 121) of postal server 120 by bridge server 110, such as by bridge server 110 identifying a postal server account indexed to the authenticated user name in bridge data 111. Bridge server 110 will preferably negotiate with postal server 120 using the native security protocols and user credentials of postal server 120, such as may also be indexed to the authenticated user name in bridge data 111, to access the appropriate account. When the user's credentials have been authenticated, transactions may then flow from the client operable upon one of terminals 151-153 to bridge server 110, where bridge server 110 will translate those transactions into the native protocol of postal server 121, if necessary, and then postal server 121 will send responses to the client through bridge server 110, with bridge server 110 translating the responses as necessary.

Operation according to embodiments of the invention, bridge server 110 further provides user authentication services such that a client interacts directly with an application of store server 160. Accordingly, a client may load a web page provided by an online store application of store server 160 which queries the user for a user name and password, preferably using standardized security protocols. However, rather than authenticate the provided credentials, store server 160 of the illustrated embodiment is adapted to provide the credentials to bridge server 110. Bridge server 110 may then compare the user name and password information provided by the client application to user name and password information stored in bridge data 111. A valid user will be correlated to an appropriate account (e.g., an associated online store account) of store server 160 by bridge server 110, such as by bridge server 110 identifying an online store account indexed to the authenticated user name in bridge data 111. Having authenticated the user's credentials, bridge server 110 may provide an acknowledgment to store server 160 that the credentials are valid or may provide a set of credentials (e.g., retrieved from bridge data 111 stored in association with the user name provided by the client) which are native to store server 160. When the user's credentials have been authenticated, transactions may then flow from the client operable upon one of terminals 151-153 to store server 160, and then store server 160 will send responses to the client directly.

According to a preferred embodiment, when bridge server 110 has successfully authenticated a user's credentials, an authentication token is provided to the requesting server, in this example store server 160. This authentication token preferably serves as an indication that store server 160 is interacting with a valid user and may proceed with operations of a current session in association with the indicated account. Accordingly, the authentication token may include information with respect to an account to be utilized, limitations on use, etcetera. Where particular operations are to be invoked, such as those operations which involve or invoke bridge server 110 (e.g., debiting an account, changing an account password, etcetera), the authentication token may be passed back to bridge server 110 by store server 160 for validating the user's rights to perform the operation. If the validation token is not valid for any reason, such as the user does not have rights to perform the operation, the session associated with the validation token has expired, or the validation token is not valid, bridge server 110 may prevent the operation. For example, where store server 160 is passing the validation token to bridge server 110 for revalidation of the user prior to store server 160 performing the operation, bridge server 110 may not pass any token back to store server 160, or may pass a token indicating an unsuccessful validation to store server 160, thereby causing store server 160 to not perform the operation. Where bridge server 110 is to perform some or all of the operation, or to arbitrate performance of some or all of the operation by other systems, bridge server 110 may not perform the operation where the validation token is not successfully revalidated, perhaps passing a token indicating an unsuccessful validation to store server 160. Where an authentication token has failed a revalidation process, store server 160 may operate to terminate the user's session or prevent the attempted operation and allow the session to continue, perhaps in some limited capacity.

Figure 2:
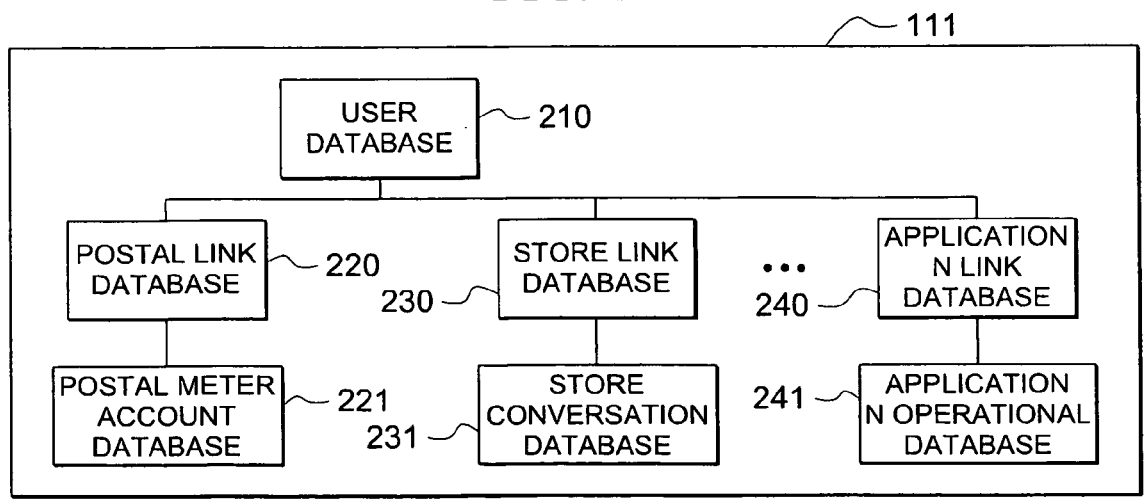
FIG. 2 shows a high level block diagram of a data structure used for storing user credentials and associated information according to an embodiment of the present invention.

Directing attention to FIG. 2, a high level block diagram of a data structure as may be utilized with respect to bridge data 111 storing the above user credentials and associated information is shown. Specifically, bridge data 111 of the illustrated embodiment includes user database 210 which includes user identification information useful for mapping user credentials provided as discussed above to appropriate accounts of a plurality of applications. Various databases are provided with respect to each such application in the illustrated embodiment to facilitate access to the appropriate account(s) thereof. Specifically, link databases (shown as postal link database 220 associated with postal server 120, store link database 230 associated with store server 160, and application N link database associated with an application not expressly shown in FIG. 1) are provided with respect to each application for storing account information (e.g., application specific credentials, application account identification, etcetera) for each such application. The illustrated embodiment further includes application operational databases (shown as postal meter account database 221 associated with postal server 120, store conversation database 231 associated with store server 160, and application N operational database 241 associated with an application not expressly shown in FIG. 1) provided with respect to each application for storing operational information (e.g., conversation type information, conversation status information, conversation limitations, etcetera) for each such application.

According to a preferred embodiment, bridge server 110 accesses user database 210 of bridge data 111 to validate the user name and password combination and to generate an authenticator string if the user name and password combination are valid. For example, the user name may be used as an index key to locate password information in user database 210 of bridge data 111. If the password information retrieved from user database 210 corresponds to the password information provided by the client, bridge server 110 may determine that the user is valid and thus proceed to generate an authenticator string to enable further transactions from the client.

Information stored in association with users in user database 210 of the exemplary embodiment preferably includes user identification information. This user identification information may be used as a user identifier in the authenticator string, as an index key for identifying relational data stored in other databases, such as application link databases 220-240. For example, a record associated with the user name provided by the client may include a user identifier or identifiers for associating that user with one or more applications through matching that user identifier with records stored in any or all of application link databases 220-240.

According to a preferred embodiment, the aforementioned application link databases and their associated operational databases cooperate to provide desired access to appropriate accounts of an associated application. Such access may be configured to be one user to many accounts, many users to one account, or one user to one account using the user mapping provided by databases of preferred embodiments of the invention. For example, each user authorized to access applications will preferably have a unique record indexed by their user identification information in an appropriate application link database (e.g., postal link database 220 for users authorized to access a postage generation and printing secure application and store link database 230 for users authorized to access online store functionality). A plurality of these users may map to a same application account by having the same customer identification information stored in their respective records in the application link database. Each such user would then preferably be mapped to a same record in the appropriate secure application account database (e.g., postal meter account database), and thus would share use of the same secure application account. A user may likewise map to a plurality of application accounts, whether associated with a same or different applications, by having the same customer identification information stored in various application link databases.

Exemplary embodiments of the foregoing databases as may be utilized according to the present invention are provided in the tables below. It should be appreciated, however, that various data fields may be provided in ones of the databases other than shown, in addition to or in the alternative to their being provided as shown. Moreover, various data fields may be omitted and/or added with respect to the exemplary databases according to embodiments of the invention. For example, although the exemplary user database record includes one set of password salt, password, codeword 1, codeword 2, prior password 1 salt, prior password 1, prior password 2 salt, prior password 2, prior password 3 salt, prior password 3, prior password 4 salt, prior password 4, embodiments of the present invention may include a set of such credentials for each of a plurality of applications, such as where a plurality of applications provided single sign-in according to the present invention require native security protocols and/or credentials.

Bridge Data
User Database Record
User Database 210

| Field | Definition |
|---|---|
| User ID | Unique user identification |
| User Name | User name |
| Password Salt | Pseudo random value combined with password information to increase security of password hash |
| Password | Hash of (password + password salt value) |
| Codeword 1 Salt | Hash of (first codeword + codeword 1 salt value) |
| Codeword 2 Salt | Hash of (second codeword + codeword 2 salt value) |
| Prior Password 1 Salt | Pseudo random value combined with prior password 1 information to increase security of prior password 1 hash |
| Prior Password 1 | Hash of (prior password 1 + prior password 1 salt value) |
| Prior Password 2 Salt | Pseudo random value combined with prior password 2 information to increase security of prior password 2 hash |
| Prior Password 2 | Hash of (prior password 2 + prior password 2 salt value) |
| Prior Password 3 Salt | Pseudo random value combined with prior password 3 information to increase security of prior password 3 hash |
| Prior Password 3 | Hash of (prior password 3 + prior password 3 salt value) |
| Prior Password 4 Salt | Pseudo random value combined with prior password 4 information to increase security of prior password 4 hash |
| Prior Password 4 | Hash of (prior password 4 + prior password 4 salt value) |
| Temp Password Salt | Pseudo random value combined with temporary password information to increase security of temporary password hash |
| Temp Password | Hash of (temporary password + temporary password salt value) |

As shown above, for each individual user, bridge data 111 of a preferred embodiment stores user identification, user name, password salt value (e.g., pseudo random value), and password hash (or other masked password data) which may be used in the validation of the user. Moreover, it can be appreciated that a user database utilized according to embodiments of the invention may include information in addition to that used in validating the user. For example, code words 1 and 2 may be utilized in the case of the user having forgotten their password in order to validate the user for generation of a new password. The temporary password may be utilized to issue the user a temporary password to facilitate the user accessing bridge server 110, postal server 120, and/or store server 160 to generate a new password in the case of the user having forgotten their password. Prior passwords 1-4 may be used to prevent a user from reusing a prior password in a cycle of less than a selected number of password rotations. Other information stored in association with users in the user database of the exemplary embodiment includes user identification information. This user identification information may be used as a user identifier in the authenticator string, as an index key for identifying relational data stored in other databases, such as application link databases discussed below, etcetera.

Bridge Data
Postal Link Database Record
Postal Link Database 220

| Field | Definition |
|---|---|
| User ID | Unique user identification |
| Customer ID | Unique customer identification for postal meter account |
| CTK | Current conversation token (pseudo random value created for each exchange between the bridge server and client with respect to a postal session) |
| PCTK | Prior conversation token (conversation token used for immediate past exchange between the bridge server and client with respect to a postal session) |
| User Caps | Limitations on the user's ability to access features and functions of the postal application and postal meter account |

As discussed above, the postal link database record of this exemplary embodiment is preferably related to a record of user database 210 through the user ID field. Similarly, the postal meter account database record of this exemplary embodiment is preferably related to a postal link database record through the customer ID field, thereby facilitating a "many to one" relationship wherein multiple users may share the use of a same postal meter account.

The current conversation token of the above exemplary embodiment comprises a pseudo random number that is generated by bridge server 110 for each authenticator string. By constantly updating the authenticator string in this manner, a replay attack is readily detected. According to a preferred embodiment, the current conversation token included in the authenticator string returned by the client in a next communication is compared to that stored in the postal link database of bridge data 111. If the conversation token does not match, the communication may be from an imposter client or from an out of sync actual client. The illustrated embodiment of the invention includes a prior conversation token to accommodate an out of sync actual client, such as in the case of a time out in the communication from the bridge server to the client and the client reissuing a communication. If the conversation token in the authenticator returned from the client does not match the current conversation token, but rather matches the prior conversation token, embodiments of the invention may operate to allow the client to continue without re-validating the user (e.g., notify the client of the failed exchange and handshake to synchronize the status of the transaction).

User configuration and management provided by a bridge server of embodiments of the present invention provides for various users having different levels of access to, or access to different features of, the secure application and/or bridge server. For example, various users may be allowed to query an account balance and to conduct a transaction debiting the account (perhaps limited to a certain value, aggregate value per period of time, etcetera), whereas other users may only be allowed to deposit funds into the account. Accordingly, the user caps filed of the exemplary postal link database field includes information with respect to the level of access and/or the different features of the postal application the user is authorized for.

| Bridge Data |
| Postal Meter Account Database Record |
| Postal Meter Account Database 221 |

| Field | Definition |
|---|---|
| Customer ID | Unique customer identification for postal meter account |
| Postal Conversation | Postal application credentials sufficient for the bridge server to access the appropriate postal meter account |
| Minimum Client Version | Lowest client version permitted to access the postal application through the bridge server |
| In Use | In use flag for indicating the postal meter account is currently in use by a user |
| In Use By Machine | Identification of bridge server setting the in use flag as using the postal meter account |

Additional credentials as may be needed by the postal application are preferably stored in the postal meter account database record as the postal conversation field. Accordingly, bridge server 110 may reference these credentials by the customer ID corresponding to the user's user ID.

The minimum client version of the exemplary embodiment may be used in accommodating a migration from clients using a proprietary protocol operable directly with postal server 120 to clients using a protocol (e.g., industry standard security protocol) operable with bridge server 110. For example, where one user associated with a particular customer ID or postal meter account has invoked a new client using a protocol operable with bridge server 110, bridge server 110 may negotiate with postal server 120 to take ownership of the postal credentials (e.g., stored in the postal conversation field of the postal meter account database record of bridge data 111 after a re-registration process). Therefore, subsequent users associated with that particular customer ID or postal meter account invoking an old client using a protocol operable directly with postal server 120, and thus possessing an out of date set of postal credentials (although expecting to exchange those credentials with postal server 120), may no longer be able to access features of postal server 120. Accordingly, bridge server 110 may recognize the client version (such as within a header of the login request, in a format of the login request, by the particular address the login request was directed toward, etcetera) and require that at least a minimum client version (e.g., an earliest client version implementing the security protocols supported by bridge server 110) be used.

The in use field of the exemplary embodiment is utilized to cause bridge server 110 to delay a transaction with a second user when a first user is conducting a transaction using the secure application account. Such serialization of user access to the postal meter account prevents situations where an account balance appears sufficient for each user's transaction separately, but as one user commits the funds the other user's transaction fails. In operation according to a preferred embodiment, the in use field would delay the second user's query of the account balance until the first user completed the transaction (or timed out), thus showing the second user the available account balance after the first user's transaction. Of course, where such serialization is not desired, embodiments of the invention may operate to allow parallel access to secure application accounts (or parallel access with respect to particular account transactions).

The in use by machine filed of the exemplary embodiment is utilized in clearing a "hung" transaction in the case of a bridge server failure. For example, where a plurality of bridge servers are implemented to support a high volume of user transactions, a particular bridge server may mark a postal meter account as in use and then the bridge server may malfunction and fail to complete the transaction. Other users, perhaps accessing the postal meter account via other ones of the bridge servers, may be delayed indefinitely waiting for the failed bridge server to release the postal meter account. However, because the particular bridge server which marked the postal meter account as in use is identified, the postal meter account may confidently be released knowing that the bridge server has failed and will not complete the transaction.

| Bridge Data |
| Store Link Database Record |
| Store Link Database 230 |

| Field | Definition |
|---|---|
| User ID | Unique user identification |
| Store ID | Unique customer identification for store account (may include credentials, such user name and password, used for accessing the store account) |

As discussed above, the store link database record of this exemplary embodiment is preferably related to a record of user database 210 through the user ID field. In this exemplary embodiment, the unique customer identification for a store account is provided in the store link database, stored in association with the user ID. Accordingly, a "one to one" relationship is established wherein each user (as identified by a unique user identification) is identified with a separate online store account.

| Bridge Data |
| Store Conversation Database Record |
| Store Conversation Database 231 |

| Field | Definition |
|---|---|
| User ID | Unique user identification |
| Store Conversation ID | Identification of a particular store conversation |
| SCTK | Current store conversation token (pseudo random value created for each exchange between the store server and client with respect to an online store session) |
| PSCTK | Prior conversation token (conversation token used for immediate past exchange between the store server and client with respect to an online store session) |

As discussed above, the store conversation database record of this exemplary embodiment is preferably related to a record of store link database 230 through the user ID field. A user may invoke multiple simultaneous conversations with the store application according to a preferred embodiment. Accordingly, store conversation ID identifies which particular conversation the store conversation database record is associated with. This information may be included in an authenticator string utilized according to the present invention to correlate a particular series of authenticator strings with a particular conversation.

As with the current conversation token of the exemplary postal link database record described above, the current store conversation token of the above exemplary embodiment comprises a pseudo random number that is generated by bridge server 110 for each authenticator string. By having separate conversation tokens for each such application as may be simultaneously utilized by a user, separate series of authenticator strings (e.g., one or more authenticator strings for each application) may readily be generated, managed, and verified.

The illustrated embodiment of the invention includes a prior conversation token to accommodate an out of sync actual client, such as in the case of a time out in the communication from the bridge server to the client and the client reissuing a communication. If the conversation token in the authenticator returned from the client does not match the current conversation token, but rather matches the prior conversation token, embodiments of the invention may operate to allow the client to continue without re-validating the user (e.g., notify the client of the failed exchange and handshake to synchronize the status of the transaction).

As discussed above, embodiments of the invention utilize an authenticator string passed between a client and bridge server, perhaps via an application server such as store server 160, in order to detect attacks with respect to a client conversation after client sign-in. In operation according to one embodiment, when a user initially signs-in, whether through bridge server 110 or through an application server such as store server 160, bridge server 110 authenticates the user's credentials (e.g., comparing the user name and password to information stored in bridge data 111) and issues an authenticator string to the client if the authentication is successful. For example, bridge server 110 accesses bridge data 111 to validate the user name and password combination and to generate an authenticator string if the user name and password combination are valid. The user name may be used as an index key to locate password information in a user database of bridge data 111. If the password information retrieved from the user database of bridge data 111 corresponds to the password information provided by the client, bridge server 110 may determine that the user is valid and thus proceed to generate an authenticator string to enable further transactions between the client and bridge server 110, postal server 120, store server 160, and/or payment server 170.

According to a preferred embodiment, the authenticator string is returned by the client with the subsequent communication, the authenticator string is validated by bridge server 110 (as may be passed thereto directly by the client in the case of postal server 120 or indirectly by an application server such as store server 160), and a new authenticator string is returned to the client (again, as may be passed directly by bridge server 110 in the case of postal server 120 or indirectly by an application server in the case of store server 160) with any responsive communication. By constantly updating the authenticator string in this manner, a replay attack is readily detected. Moreover, communications outside of the client conversation, even those were the user is innocently logged on from a different terminal, is readily detected due to the authenticator string (although perhaps being a legitimate authenticator string) being out of sync.

It should be appreciated that the foregoing authenticator string need not be passed between a client and bridge server 110 and/or store server 160 in each transaction of a conversation. For example, many transactions within a conversation may be benign and unimportant to security issues, such as viewing a catalogue of available items. Accordingly, an authenticator string may not be returned by a client when such a transaction is conducted. However, other transactions wherein security or other concerns suggest user validation is desired (e.g., change password, access funds from an account, change user profile, etcetera) may include returning the authenticator string to provide validation of the user and protect against attacks.

Embodiments of the invention provide the authenticator string as a "cookie" (e.g., browser data packet) or other "out of band" data packet (e.g., separated from the primary session data). For example, the authenticator string may be transmitted with a login acknowledgement response as a non-persistent cookie that is to be held in memory by the client and returned with a next communication to bridge server 110 or an application server (e.g., store server 160). The use of such cookies is advantageous because the client need not implement any proprietary protocols to identify the data packet and separate it from the "in band" session data. Moreover, protocols for receiving and re-transmitting cookies are available in many industry standard clients, thereby facilitating the use of standardized client interfaces. The use of a non-persistent cookie is preferred in order to avoid storage of the authenticator string in non-volatile memory, such as a hard disk, and thus provide additional security against the misuse of the authenticator string.

From the above, it can be appreciated that the illustrated embodiment of bridge server 110 handles user authentication for each of a plurality of applications. Accordingly, when a user signs-in with respect to one such application, bridge server 110 will have authenticated that user and issued an authenticator string. This authenticator string may be utilized not only to continue a conversation between the client and a particular one of the applications, but may also be utilized in accessing other ones of the applications without requiring the user to again provide the sign-in credentials.

For example, after having accessed bridge server 110 to sign-in with respect to a secure account of postal server 120, a client may be provided one of the aforementioned authenticator strings. The client may then be directed to interact with a different account, such as an online store account of store server 160. Accordingly, when accessing this application, the client may provide the authenticator string, whether in the initial communication to the application server or in response to a request for credentials (e.g., in response to a query for user name and password). The application server may then provide the authenticator string to bridge server 110 for validation, similar to what the application server may do to originally authenticate user credentials and much like what the application server would do to validate each transaction received from a client according to embodiments of the invention. Assuming the authenticator is valid and has not expired, bridge server 110 preferably issues a new authenticator string (e.g., updated and/or adapted for use with this particular application) to facilitate subsequent communication between the client and application server.

It should be appreciated that the same or different authenticator strings may be utilized with respect to various ones of the applications that user authentication is provided by bridge server 110. For example, various applications may have particular features or functions suggesting information in a authenticator string be provided with respect thereto which is not utilized in association with one or more other application. As but one example, store server 160 may facilitate multiple conversations with respect to a single user, such as to allow viewing and/or interacting with an electronic cart containing the user's selections of goods to purchase, viewing of a catalogue of items, etcetera. Accordingly, the authenticator string may include a conversation identifier in order to associate the authenticator string with a corresponding one of the conversations. The user session may thus utilize multiple simultaneously valid authenticator strings, such as to provide one for each conversation within the application. Moreover, the user session may utilize multiple simultaneously valid authenticator strings, perhaps containing different information or information fields, for use with respect to different ones of the applications (e.g., where a users is using both postal server 120 and store server 160).

The authenticator string of a preferred embodiment includes information setting an expiration time for the authenticator, information identifying the user, information identifying the conversation type, information identifying the state of the conversation, information identifying the conversation, and information for authenticating the authenticator string. For example, an embodiment of the invention provides an authenticator string including the following variables:

exp (authenticator string expiration, e.g., 24 hours from time the authenticator string is issued)

uid (unique user identifier, preferably unique shorthand user identifier associated with the user name provided by the client in the login request)

cty (conversation type, e.g., "postal," to identify the particular secure application where the bridge server provides operation with respect to a plurality of different secure applications)

ctk (conversation token, preferably uniquely identifies or is uniquely associated with the current state of the conversation between the client and the bridge server, may be a random number generated for each authenticator string to identify replay attacks)

cid (conversation identification, preferably identifies a particular conversation associated with the user's session, such as to distinguish authenticator strings between a plurality of applications and/or a plurality of simultaneous sessions within an application)

mac (message authentication code, preferably comprises a hash (e.g., HMAC-SHA1 hash) of the authenticator string and a secret known only to the bridge server, or the result of another masking algorithm applied to the authenticator string)

wherein exp, ctk, and mac change for each subsequent authenticator string in a series of authenticator strings used in a conversation, and cid will be different for each authenticator string series used with respect to a user's session.

Embodiments of the present invention are operable to utilize bridge server 110 not only for providing single sign-in with respect to a plurality of accounts, but also to provide functionality previously unavailable with respect to the applications. For example, as described in detail in the above referenced patent application entitled "Secure Application Bridge Server," embodiments of bridge server 110 may combine various transactions to provide transactions not previously available. Moreover, bridge server 110 of embodiments provides mapping of users to application accounts to facilitate utilization of a single account by multiple users, preferably providing robust reporting of utilization showing information down to a user level. Because bridge server 110 of preferred embodiments has visibility into a user's utilization of various applications, bridge server 110 of embodiments may link the user's experience between applications. For example, the items presented to a user with respect to that user's online store account may be related to that user's available postal features (e.g., using the above described user caps information). Similarly, the items presented to a user with respect to that user's online store account may be related to a transaction that user is currently conducting with respect to the postal generation and printing application.

Additionally or alternatively, bridge server 110 may provide integrated reports, aggregating user activity across multiple accounts and/or applications. For example, a user may receive a monthly report of all their postage purchases and prints as well as their purchases of postal supplies. Moreover, unified billing for service fees associated with the user of multiple accounts may be provided according to the present invention. Business intelligence may be used to analyze user's behavior across multiple accounts to provide information to business and marketing regarding aggregated or related usage of various services. Not only may messages related to a particular application the user is currently using be provided to the user but, through integration provided by bridge server 110 of embodiments of the invention, messages related to other applications for which the user has a account for may be provided to the user. Similarly, as a user's use of one application suggests a need for use of another application (e.g., printing stamps requiring controlled stock suggesting the need to order more controlled stock), integration provided by single sign-in of embodiments of the invention provides messages and/or automation to facilitate use of the other application.

In addition to providing sharing of a user base for single sign-in with respect to a plurality of accounts, embodiments of the present invention provide additional shared functionality. For example, payment processing functionality may be utilized by various ones of the applications. Accordingly, rather than each application individually processing payments, embodiments of the present invention provide payment processing functionality shared by the applications for which single sign-in is provided.

Referring again to FIG. 1, payment server 170 is shown in communication with bridge server 110, postal server 120, and store server 160 according to an embodiment of the invention. Payment server 170 is utilized to process payment transactions, such as electronic commerce, credit card, debit card, electronic check, etcetera, for each of postal server 120 and store server 160. In operation according to embodiments, bridge server 110 may communicate with payment server 170 on behalf of a particular application, similar to bridge server operating to sign-in users with respect to accounts of postal server 120 as described above, to obtain payment authorization and provide an acknowledgement thereof to the appropriate application. Additionally or alternatively, applications may interact directly with payment server 170, similar to store server 160 interacting directly with clients as described above, to obtain payment authorization. In either of the foregoing scenarios, bridge server 110 may provide integration useful in payment processing, such as to obtain payment account stored by or with respect to one application for use in payment processing with respect to or by another application. According to one embodiment, user payment information (e.g., credit card accounts, bank accounts, etcetera) is not available to each application, but rather is provided to a few or one application, or in some embodiments to bridge server 110, and accessed as needed through integration provided by bridge server 110.

Additionally or alternatively, bridge server 110 of embodiments of the invention facilitates acquisition and management of information, such as user profile information, among the various applications. For example, an online store application of store server 160 may store robust user profile information, such as user name, address, phone number, etcetera. Although traditionally requiring separate input into the various applications a user may have accounts for, embodiments of the present invention facilitate sharing this information among such applications. Bridge server 110 of a preferred embodiment uses this information as stored by the online store application as a repository or source for the user profile information and makes it available to any of the other applications, such as a postage printing application of postal server 120, as needed. Such an embodiment provides a single point where the user may input, manage, and update the user profile information. For example, after a user inputs user profile information, or updates user profile information, bridge server 110 may propagate that information, as appropriate, to various applications for which the user has accounts for. Additionally or alternatively, bridge server 110 may dynamically retrieve such information from a repository application and make that information available as needed by other applications.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    receiving bridge server user credentials of a user of a client;
    validating, at a bridge server, said client with said bridge server based on said received bridge server user credentials;
    storing, at said bridge server, first application user credentials for validating said client to a first application and second application user credentials for validating said client to a second application;
    issuing, by said bridge server, a first authentication string to said client, upon validating said client with said first application, wherein said first authentication string is used by said client to access said first application;
    issuing, by said bridge server, a second authentication string to said client, upon validating said client with said second application, wherein said second authentication string is used by said client to access said second application, and wherein said first authentication string is different from said second authentication string;
    establishing a session between said client and at least one of said first application and said second application;
    storing a conversation record in association with said session; and
    managing, by said bridge server, said session by using at least one of said first authentication string and said second authentication string to reference said at least one stored conversation record.

2. The method of claim 1 wherein said issuing a first authentication string comprises:
    generating said first authentication string; and
    sending said first authentication string to said client.

3. The method of claim 1 wherein said first authentication string comprises a pseudorandom number.

4. The method of claim 1 further comprising:
    receiving a communication from said client, wherein said communication comprises a return first authentication string; and
    validating said communication by determining said return first authentication string corresponds with said first authentication string.

5. The method of claim 4 further comprising issuing a new first authentication string comprising:
    generating said new first authentication string in response to validating said communication; and
    sending said new first authentication string to said client.

6. The method of claim 5 further comprising:
    receiving a second communication from said client, wherein said second communication comprises a new return first authentication string; and
    validating said second communication by determining said new return first authentication string corresponds with said new first authentication string.

7. The method of claim 5 further comprising:
    receiving a second communication from said client, wherein said second communication comprises a new return first authentication string; and
    validating said second communication by determining said new return first authentication string corresponds with one of:
        said new first authentication string and said first authentication string.

8. The method of claim 1 wherein said first authentication string times-out.

9. The method of claim 8 further comprising:
    receiving a communication from said client, wherein said communication comprises a return first authentication string, and wherein said communication is received after said first authentication string has timed-out; and
    validating said request by determining said return first authentication string corresponds with said first authentication string that has timed-out.

10. The method of claim 1 further comprising:
    redirecting a communication that is addressed for said first application to said bridge server.

11. The method of claim 1 further comprising:
    taking on, by said bridge server, an electronic address of said first application.

12. The method of claim 1 wherein said first application is a postage indicia generation application.

13. A system comprising:
    a bridge server configured to communicate with at least one client, a first application, and a second application and operable to store:
    at least one conversation record, said conversation record associated with a user session between said client and at least one of said first application and said second application;
    bridge server user credentials of a user of said client, wherein said bridge server uses said bridge server user credentials to validate said client with said bridge server;
    first application user credentials of said user, wherein said bridge server uses said first application user credentials to validate said client with said first application; and
    second application user credentials of said user, wherein said bridge server uses said second application user credentials to validate said client with said second application;
    a first authentication string, issued by said bridge server to said client upon said bridge server validating said client with said first application, wherein said first authentication string is used by said client to access said first application; and
    a second authentication string, issued by said bridge server to said client upon said bridge server validating said client with said second application, wherein said second authentication string is used by said client to access said second application, and wherein said first authentication string is different from said second authentication string;

wherein said bridge server is further operable to manage said user session by using at least one of said first authentication string and said second authentication string to reference said at least one stored conversation record.

14. The system of claim 13 wherein said bridge server issues a new authentication string for each communication received from said client that is determined to be valid.

15. The system of claim 13 wherein said bridge server authorizes a request, received from said client comprising a return authentication string, when said return authentication string corresponds with either said first authentication string or a previous first authentication string.

16. The system of claim 13 wherein said bridge server issues said first authentication string by generating said first authentication string and sending said first authentication string to said client.

17. The system of claim 13 wherein said first authentication string comprises a pseudorandom number.

18. The system of claim 13 wherein said bridge server receives a communication from said client, wherein said communication comprises a return first authentication string, and wherein said bridge server validates said communication by determining said return first authentication string corresponds with said first authentication string.

19. The system of claim 18 wherein said bridge server generates a new first authentication string in response to validating said communication, and wherein said bridge server sends said new first authentication string to said client.

20. The system of claim 19 wherein said bridge server receives a second communication from said client, and wherein said second communication comprises a new return first authentication string, and wherein said bridge server validates said second communication by determining said new return first authentication string corresponds with said new first authentication string.

21. The system of claim 19 wherein said bridge server receives a second communication from said client, and wherein said second communication comprises a new return first authentication string, and wherein said bridge server validates said second communication by determining said new return first authentication string corresponds with one of said new first authentication string and said first authentication string.

22. The system of claim 13 wherein said first authentication string times-out.

23. The system of claim 22 wherein said bridge server receives a communication from said client, wherein said communication comprises a return first authentication string, and wherein said communication is received after said first authentication string has timed-out, and wherein said bridge server validates said request by determining said return first authentication string corresponds with said first authentication string that has timed-out.

24. The system of claim 13 wherein said first application is a postage indicia generation application.

25. The system of claim 13 wherein a request addressed for said first application is redirected to said bridge server.

26. The system of claim 13 wherein said bridge server takes on an electronic address of said first application.

27. The system of claim 13 wherein said first authentication string satisfies security protocols of said first application, wherein said second authentication string satisfies security protocols of said second application, and wherein said security protocols of said first application are different from said security protocols of said second client.

* * * * *